(12) United States Patent
Glimpel et al.

(10) Patent No.: US 7,419,339 B2
(45) Date of Patent: Sep. 2, 2008

(54) DRILL THREAD MILLING CUTTER

(75) Inventors: Helmut Glimpel, Lauf (DE); Matthias Sperber, Reichenschwand (DE)

(73) Assignee: EMUGE-Werk Richard Glimbel GmbH & Co. Fabrik für Präzisionswerkzeuge (DE)

( * ) Notice: Subject to any disclaimer, the term of this patent is extended or adjusted under 35 U.S.C. 154(b) by 228 days.

(21) Appl. No.: 11/388,471

(22) Filed: Mar. 24, 2006

(65) Prior Publication Data
US 2006/0216125 A1 Sep. 28, 2006

(30) Foreign Application Priority Data
Mar. 24, 2005 (DE) .................. 10 2005 014 422

(51) Int. Cl.
*B23C 3/00* (2006.01)

(52) U.S. Cl. .................. 409/74; 409/73; 407/24; 407/29; 470/199; 7/157

(58) Field of Classification Search .................. 409/73, 409/74, 65, 66, 67; 408/218, 220, 221, 222; 407/24, 29; 470/198, 199; 7/157, 158
See application file for complete search history.

(56) References Cited

U.S. PATENT DOCUMENTS

| 4,651,374 | A | | 3/1987 | Turchan | |
| 4,761,844 | A | | 8/1988 | Turchan | |
| 4,831,674 | A | * | 5/1989 | Bergstrom et al. | 409/74 |
| 4,930,949 | A | * | 6/1990 | Giessler | 409/74 |
| 4,943,191 | A | * | 7/1990 | Schmitt | 409/74 |
| 5,080,538 | A | * | 1/1992 | Schmitt | 409/66 |
| 5,413,438 | A | * | 5/1995 | Turchan | 409/66 |
| 5,429,459 | A | * | 7/1995 | Palm | 409/66 |
| 5,678,962 | A | * | 10/1997 | Hyatt et al. | 409/66 |
| 5,733,078 | A | * | 3/1998 | Matsushita et al. | 409/74 |
| 6,012,882 | A | * | 1/2000 | Turchan | 409/74 |
| 6,257,810 | B1 | * | 7/2001 | Schmitt | 409/66 |
| 6,345,941 | B1 | * | 2/2002 | Fang et al. | 409/74 |

FOREIGN PATENT DOCUMENTS

WO  WO 2004/022274 A1   3/2004

OTHER PUBLICATIONS

EPO Website Translation of WO2004022274 (dated Mar. 18, 2004, Schon, Theodor) with Drawings.*
Emuge-Franken "Handbuch der Gewindetechnik und Frästechnik", published by Publicis Corporate Publishing, 2004 (ISBN 3-89578-232-7) p. 354, and English translation thereof.

* cited by examiner

*Primary Examiner*—Dana Ross
(74) *Attorney, Agent, or Firm*—Graham & Dunn PC; Kathleen T. Petrich

(57) ABSTRACT

The invention relates to a drill thread milling cutter (1) for producing a bore and for the subsequent milling of a thread in the bore, said drill thread milling cutter (1) having a working region (2), on the circumference (3) of which a number of drilling and milling cutting edges are arranged. A number of milling cutting edges (7, 8, 9, 10) greater than the number of drilling cutting edges (17) by a factor greater than 2 are arranged or are effective in the direction of rotation.

12 Claims, 3 Drawing Sheets

DRILL THREAD MILLING CUTTER

RELATED APPLICATION

The present application claims priority to German Application Serial No. 10 2005 014 422.5, filed Mar. 24, 2005, and entitled "Drill Thread Milling Cutter."

TECHNICAL FIELD

The invention relates to a drill thread milling cutter.

BACKGROUND OF THE INVENTION

Drill thread milling cutters of this type are known, for example, from WO 2004/022274 A1 or U.S. Pat. No. 4,651,374 A or U.S. Pat. No. 4,761,844 A or from Handbuch der Gewindetechnik und Frastechnik [Manual of threading practice and milling practice], publisher: EMUGE-FRANKEN, publishing firm: Publicis Corporate Publishing, year of publication: 2004 (ISBN 3-89578-232-7), page 354. With such a tool, it is possible first of all to make a generally cylindrical bore in a workpiece. For this purpose, known drill thread milling cutters have drilling cutting edges with which the bore can be produced. Once this has been done, the cutter is fed in radially, i.e. it is displaced from the centre of the bore into a position parallel to the bore axis. Arranged on the shank of the tool are milling cutting edges or milling teeth, with which a thread can then be made in the bore by means of circular thread milling. In the process, the cutting edges or milling teeth of the cutter engage jointly in a bore wall, the thread being produced by the tool being rotated and by a helical movement of the entire tool being carried out at the same time.

The drill thread milling cutter according to WO 2004/022274 A1 is said to be suitable for steel and to this end is provided with core-hole-producing cutting edges in a drilling region and with thread-producing cutting edges in an axially adjoining thread milling region. In their radial dimensions, the thread-producing cutting edges are 3% smaller than the core-hole-producing cutting edges. The absolute radial difference in distance between the core-hole-producing cutting edges and the thread-producing cutting edges therefore depends on the diameter of the drill thread milling cutter. At a typical diameter of a drill thread milling cutter of about 8 mm, the radial difference in distance between the core-hole-producing cutting edges and the thread-producing cutting edges is thus about 0.24 mm or 240 µm. Two drilling flutes arranged offset from one another by 180° are provided, at the end face of which the core-hole-producing cutting edges or drilling cutting edges are located and adjoining which in axial extension is a first axial row of thread-producing teeth or cutting edges. Furthermore, two smaller milling flutes, offset by about 90° are provided between the two drilling flutes, at which milling flutes in each case additional axial rows of milling cutting edges or milling teeth are located as additional thread-producing cutting edges. The first rows of thread-producing cutting edges at the drilling flutes are set back radially or are lowered relative to the drilling flute, in each case in order to reduce the effect of the drilling chip, which is removed by the drilling flute, on these thread-producing cutting edges at the drilling flute. The flutes become smaller from the tip of the tool towards the drill shank, as a result of which the drill thread milling cutter is strengthened in its lateral rigidity. The core diameter at the flutes is thus increased from the tip towards the shank.

Publications U.S. Pat. No. 4,651,374 A and U.S. Pat. No. 4,761,844 A concurrently describe (FIGS. 1 to 4) a drill thread milling cutter having four flutes which are offset from one another by 90° and whose cross-sections and volumes are the same, the cross-section and volume being identical axially over their entire length relative to the tool axis. At two flutes offset from one another by 180°, end drilling cutting edges are provided at the tip of the tool, these end drilling cutting edges tapering to a drill point, and, axially adjoining the end drilling cutting edges, thread milling cutting edges in the form of tooth rows are arranged at these drilling flutes. No drilling cutting edges are provided at the other two flutes, but rather only thread milling cutting edges designed as axial tooth rows. These further flutes therefore merely serve as milling flutes. The milling teeth are formed on annular segments arranged perpendicularly to the tool axis. Running centrally through the tool shank and the thread milling region is a coolant passage, which branches in the drilling region into four sectional passages which open out at the drill point in the tooth webs at which the thread milling teeth are located. The thread milling region with its thread milling cutting edges or thread milling teeth has a uniform maximum diameter which is equal to the maximum diameter of the drilling region, so that the thread milling region can be directed without interference into the bore which the drilling region has produced.

In addition to U.S. Pat. No. 4,651,374 A, U.S. Pat. No. 4,761,844 A discloses further embodiments of drill thread milling cutters (FIG. 5 to FIG. 12), in which only two flutes are provided, at which both drilling cutting edges and, following them, thread milling cutting edges are located as tooth rows. In this case, in addition to a drilling region for producing the bores, an end milling region and also a drilling region having a central recess are also disclosed. The thread milling cutting edges of the thread milling region again have a maximum diameter which is equal to or not greater than the maximum diameter of the bore-producing region, so that the thread milling region can be inserted without interference into the bore which has been produced by the bore-producing region. In addition, a countersinking bevel is provided between the thread milling region and the shank. The two flutes in this further embodiment also have the same cross-section and the same volume over the entire length of the working region.

In the drill thread milling cutter according to WO 2004/022274 A1, the angular pitches between milling cutting edges following one another in the direction of rotation amount to an angle greater than 90° between a milling cutting edge at the drilling flute and a milling cutting edge preceding in the direction of rotation, this angle being around 103° according to the drawing, and correspondingly to the complementary angle of 77° at the milling cutting edge following in the direction of rotation. In the drill thread milling cutter according to U.S. Pat. No. 4,651,374 A and U.S. Pat. No. 4,761,844 A, the angular pitches are constant and equal to 90° or 180° and thus an identical pitch is realized.

Whereas drill thread milling cutters of the previously known type can usually readily work short-chipping material, such as grey cast iron and brass for example, problems arise if long-chipping material, such as steel for example, is to be machined. This is because the long chips get into the thread milling region of the tool during the drilling, so that said thread milling regions may be damaged or destroyed.

Furthermore, it has been found in tests carried out by the applicant that the previously known drill thread milling cutters of the type mentioned at the beginning are relatively susceptible to fracture, in particular when long-chipping and/or high-strength material such as steel is machined.

In addition, the known drill thread milling cutters, as long as they are ready for operation, have a relatively low cutting capacity.

SUMMARY OF THE INVENTION

The object of the invention, then, is to develop a drill thread milling cutter of the type mentioned at the beginning.

The drill thread milling cutter is rotatable about an axis at least in one direction of rotation (cutting direction) and has firstly a drilling region with at least one drilling cutting edge for producing a bore in a workpiece and secondly a thread milling region with at least one milling cutting edge for the subsequent milling of a thread in the bore of the workpiece. According to the invention, more than twice as many milling cutting edges as drilling cutting edges are provided in the direction of rotation or at the circumference of the tool. As a result, a higher milling cutting capacity can be achieved than in the prior art, especially since the stock-removal capacity during the thread milling is in principle lower than during the drilling.

There are preferably six milling cutting edges and two drilling cutting edges, in which case at least two respective milling chip spaces with associated milling cutting edges are preferably arranged between two drilling chip spaces.

A further solution which can be combined with the further solutions but is also claimed independently proposes a drill thread milling cutter in which at least a section of the drilling cutting edge(s) has a negative rake angle, the rake angle being selected as a function of the material of the workpiece and generally being selected between −0.1° and −25° and preferably between −1° and −15°. With the negative rake angle, in contrast to the prior art, a high-strength material such as steel can also be machined with the drill thread milling cutter.

In an advantageous development, which can also be claimed independently of Patent claim 1, the drilling cutting edges project radially from the axis further outwards than the milling cutting edge(s) by a predetermined positive (equal to zero) radial difference in distance, and this predetermined radial difference in distance between the drilling cutting edges and the milling cutting edges is now set in such a way that chips produced during the drilling, even in the case of long-chipping materials such as steels, essentially do not get caught between the milling cutting edge(s) and the wall of the bore produced by the drilling region and at the same time the milling cutting edge(s) does not engage (do not engage) in the workpiece during the drilling, and/or that the predetermined difference in distance assumes a value from a range of 0.005 mm to 0.03 mm, preferably from 0.01 mm to 0.025 mm.

In contrast to this, in WO 2004/022274 A1, with the 3% specified, a substantially larger difference in distance, which also increases with increasing tool diameter, for setting the milling cutting edges back radially relative to the drilling cutting edges is proposed. However, as was only shown by extensive tests carried out by the applicant, this large distance leads to chips which originate from the drilling operation getting caught between the milling cutting edges and the bore produced by the drilling cutting edges, in particular in the case of long-chipping material such as steel, and thus leads to quick destruction of the tool.

In the drill thread milling cutters proposed in U.S. Pat. No. 4,651,374 A or U.S. Pat. No. 4,761,844 A, the focus of attention is solely to prevent the thread milling cutting edges from being impaired during the drilling, and the thread milling cutting edges are therefore designed to exactly the same radial dimensions as the drilling cutting edges. The problems associated with drilling chips getting caught in the case of long-chipping materials are also not alluded to in these publications. Although no drilling chips would become caught between the milling cutting edges and the bore wall in such a design having thread milling cutting edges and drilling cutting edges of the same radial size, these known tools are nonetheless unsuitable for long-chipping materials such as steel.

In a further solution of the stated object, which can also be claimed independently of Patent claim 1, axially relative to the axis of the drill thread milling cutter, following at least one drilling cutting edge of the drilling region, in each case at least one associated milling cutting edge of the thread milling region is located at an associated common drilling chip space (drilling flute) for removing the drilling chips produced by the drilling cutting edge, said drilling chip space preferably also being provided for removing the milling chips produced by the milling cutting edges. An enlargement of the drilling chip space in the delivery direction or in the axial direction from the drilling region over the thread milling region is now provided by the diameter of each drilling chip space at the point closest to the axis or at the innermost point decreasing in axial extension or by the volume of each drilling chip space increasing in this axial extension. Long chips of a long-chipping and at the same time quite elastic material such as steel can thus also be removed in an improved manner, since the unrolling or misshaping of the chips in the flute can be partly compensated for by the enlargement of the latter.

In a further solution of the stated object, which can also be claimed independently of Patent claim 1, at least one drilling cutting edge, preferably each drilling cutting edge, has defined rounding. As a result, improved chip breaking behavior can be achieved, so that long-chipping materials can be machined more effectively, and/or the cutting edge is stabilized, which is especially advantageous in high-strength and hard materials such as steel.

In one configuration, the rake faces of milling cutting edges or milling teeth adjacent in the axial direction form an essentially continuous surface, which is preferably flat or even curved. If the rake faces are viewed from the side, that is to say perpendicularly to the surface normal, previously known drill thread milling cutters have a stepped profile, which has turned out to be disadvantageous during the milling operation. The proposal removes this disadvantage. The milling teeth reach directly up to the flute with a continuous rake face.

The spacing of the milling cutting teeth may be unequal, such that two milling cutting teeth, of which the front one lies at a drilling chip space, follow one another at an angle of at most 88°, in particular between 62° and 88°, in particular preferably between 82° and 85° or between 72° and 78°, in particular 75°.

Furthermore, the thread webs with the milling cutting edges can narrow to the rear, for example conically, by the radial distances of the milling cutting edges in each axial row or by the outer radius of the thread milling region from the axis decreasing in a direction away from the drilling region, in particular by 0.15% to 1%, preferably by 0.15% to 0.5%, and preferably around approximately 0.2%, in each case over the axial length. The radial drift of the tool is compensated for by the narrowing, this drift being especially large in the case of steels.

At least a section of the boundary surface of at least one chip-receiving space—as viewed in axial direction—preferably runs in a circular or elliptical shape. A parabolic or hyperbolic course is also possible. The boundary surface of at least one chip-receiving space—as viewed in axial direction—is designed to be symmetrical or asymmetrical relative to a line running radially through the axis. Here, a symmetrical course is preferred for short-chipping materials, such as grey cast iron for example, whereas the asymmetrical course is usually selected in the case of long-chipping materials, such as steel for example, which produce a longer, curling chip.

All the milling cutting edges may be designed as linearly or spirally (helically) running tooth webs. The other milling cutting edge following the one milling cutting edge in the direction of rotation of the tool can be set back at the end face of the shank in the axial direction by a predetermined amount. The following tooth webs are accordingly set back axially, which may be effected, for example, by the conical point grinding of the end face of the drill thread milling cutter. By the following tooth webs being set back, this also ensures that the cooling lubricant which discharges in the end region of the milling flute passes into the drilling flute to a sufficient extent during the drilling.

An outlet opening for cooling lubricant may be arranged in the region of the end face of the working region of the tool.

The chip-receiving spaces may form a right-hand or a left-hand spiral flute. As a result, the tool is suitable for left-hand cutting or right-hand cutting. It is also possible for a straight-fluted design to be provided.

To increase the service life, at least some of the milling cutting edges may be coated with mechanically resistant material. The preferred mechanically resistant material is titanium aluminum nitride (TiAIN).

In order to be able to countersink the bore, a development provides for a countersinking section to be arranged on that end of the shank of the drill thread milling cutter which is remote from the end face. In this case, the countersinking section preferably has a cutting edge which is arranged at 45° to the axis of the drill thread milling cutter.

The proposals mentioned lead in each case to an improved drill thread milling tool, with which the cutting of long-chipping material such as steel is possible for the first time. In particular, a drill thread milling cutter is provided which is characterized by improved chip breaking behavior, so that both short- and long-chipping materials can be readily worked. The service life of the tool is thus relatively long, so that the cutter can be used economically.

These and other advantages will become more apparent upon review of the drawings, the best mode for carrying out the invention, and the claims.

BRIEF DESCRIPTION OF THE DRAWINGS

Like reference numerals are used to designate like parts throughout the several views of the drawings, wherein.

BEST MODE FOR CARRYING OUT THE INVENTION

Figure 1:
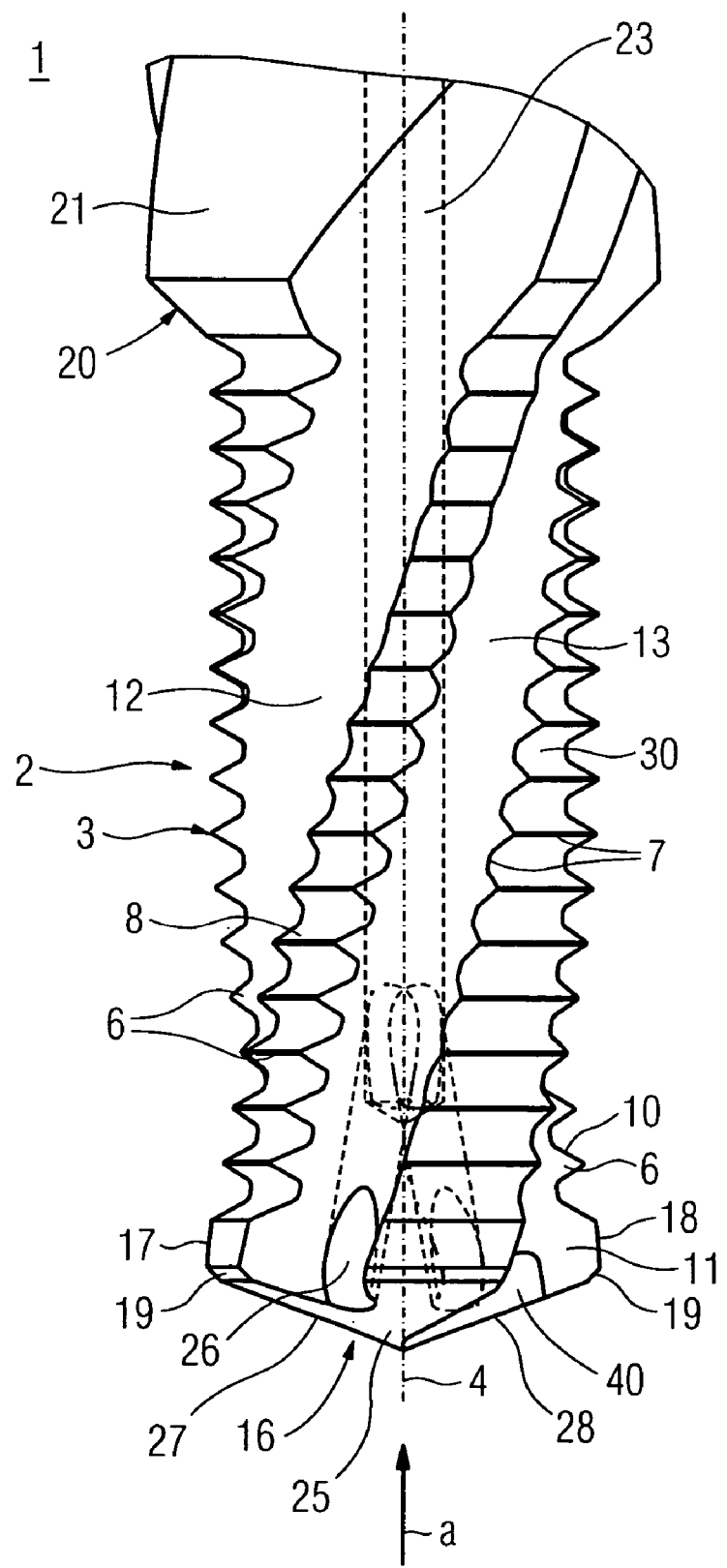
FIG. 1 shows the bottom section of a drill thread milling cutter in a perspective side view.
Figure 2:
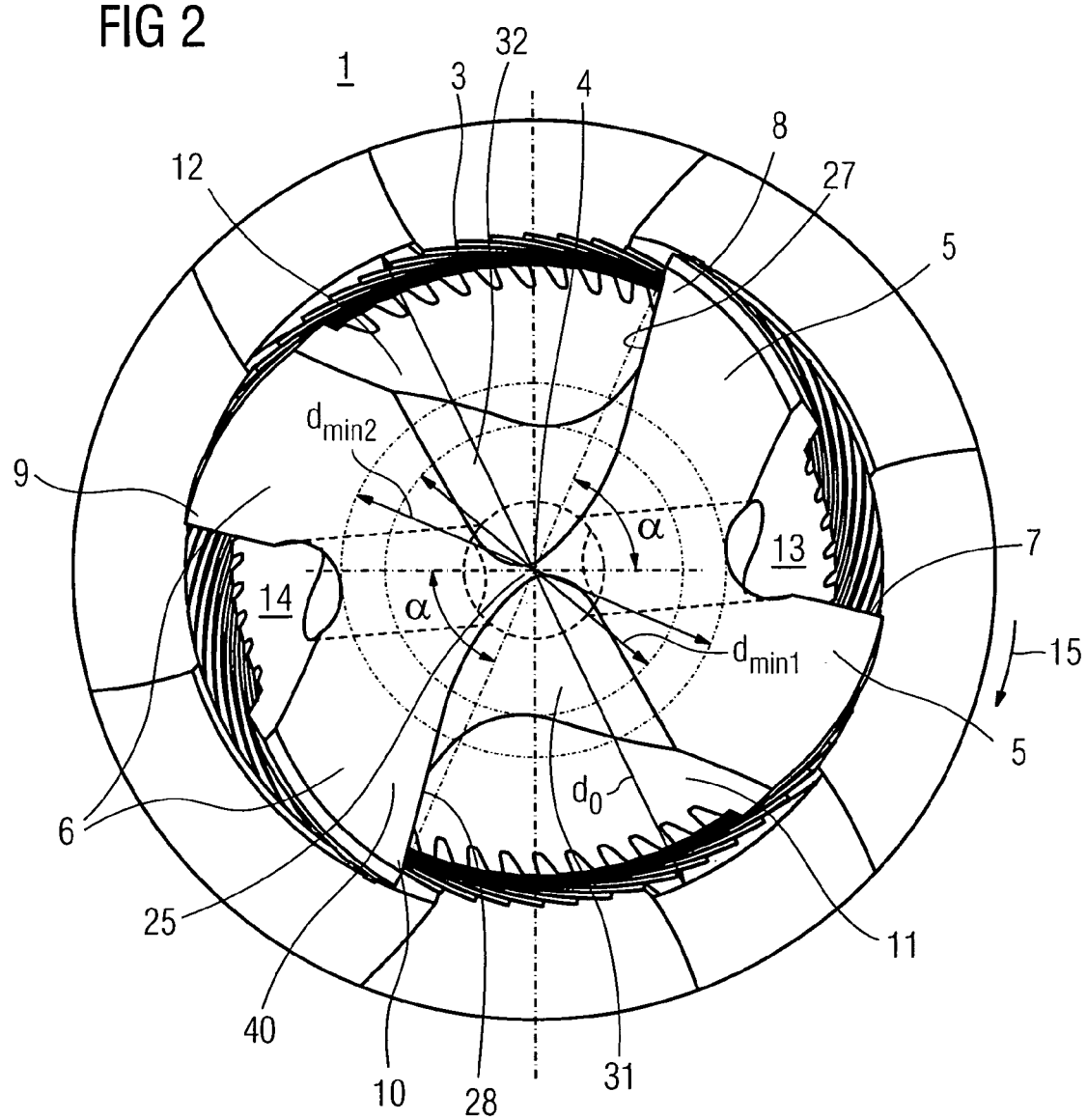
FIG. 2 shows the drill thread milling cutter according to FIG. 1 in an end view.
Figure 3:
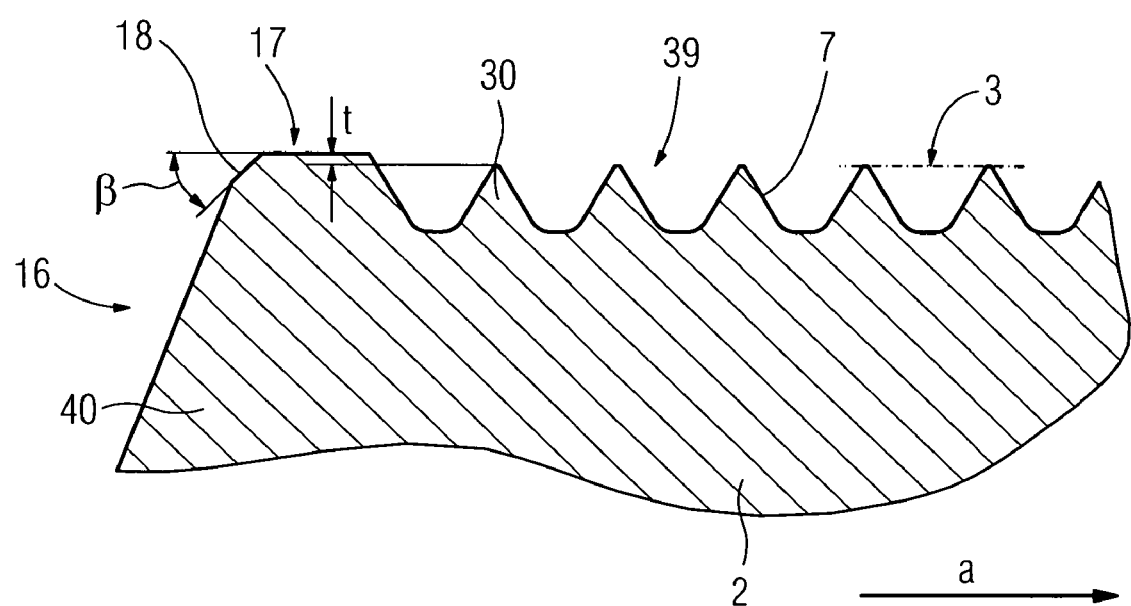
FIG. 3 shows part of the drill thread milling cutter according to FIGS. 1 and 2 in a longitudinal section.

Sketched in FIGS. 1 to 3 is a drill thread milling cutter 1 which has an, in particular cylindrical, shank 21 for the tool mounting in a machine tool. A working region (cutting part) 2 reduced in diameter is formed on the other end of the shank 21, in particular in one piece or by attaching at least one prefabricated part. When it is in use, the tool or drill thread milling cutter 1 rotates about its axis 4, which passes through the shank 21 and the working region 2 and is generally a longitudinal axis and/or main axis of inertia, in the direction of rotation 15, in the present case clockwise or right-hand rotation (right-hand cutting).

The working region 2, at its end, has a drilling region 40 for producing a bore (a hole or a recess) in a workpiece and, at an essentially cylindrical circumference (or: envelope end) 3, has a thread milling region 30, arranged axially offset from the drilling region 40 with respect to the axis 4, for producing a thread in the bore, produced by the drilling region 40, by thread milling.

Provided in the drilling region 40 at the end face 16 are two drilling main cutting edges 27 and 28, which are offset by approximately 180° and run forwards to a drill point 25 at an angle to the axis 4, and also provided are two drilling lateral cutting edges 17 and 18 which adjoin the drilling main cutting edges 27 and 28 in each case via a bevel 19 running at an angle β of 45°. The bevel 19 is advantageous when machining grey cast iron materials, but may also be dispensed with in the case of other materials.

As can best be seen in FIG. 2, the drill thread milling cutter 1, in the thread milling region 30, has two milling cutting edge pairs 5 and 6 which in each case consist of two milling cutting edges 7 and 8 and respectively 9 and 10. The two milling cutting edges 7 and 8 and respectively 9 and 10 are at an angular distance apart which is less than 90°, preferably at most 88°, i.e. the milling cutting edge 8 or 10 following in the tool rotation direction (cutting direction) 15 follows the preceding milling cutting edge 7 or 9, respectively, after an angle α of at most 88°. Preferred values for the angle a lie between 62° and 88°, a value of 75° in particular preferably being provided.

This results in a chip thickness distribution during the thread milling. Due to the unequal angular distribution of the milling cutting edges, smooth running, little tendency to chatter and improved surface quality in the finished thread are achieved.

A respective chip-receiving space 11 or 12 is located between the milling cutting edges 7 and 10, on the one hand, and 8 and 9, on the other hand, of different milling cutting edge pairs 5 and 6. Furthermore, a respective additional chip space 13 or 14 is likewise located between the milling cutting edges 7 and 8 or 9 and 10 of identical milling cutting edge pairs 5 and 6.

The chip space 12 extends forwards up to the drilling lateral cutting edge 17 and the drilling main cutting edge 27, and the chip space 11 extends forwards up to the drilling lateral cutting edge 18 and the drilling main cutting edge 28 and forms there the rake face for the chips of the workpiece material which are produced during the drilling. The two chip spaces 11 and 12 are designed to be relatively large or to have a relatively large volume in order to remove the comparatively large chips accumulating during the drilling operation.

The chip-receiving spaces 13 and 14 together with the chip spaces 11 and 12 remove the chips during the thread milling. Since the chip-receiving spaces 13, 14 serve to deliver the chips only during the thread milling, but not during the drilling, they only have to receive the smaller milling chips and can therefore be of smaller design. With regard to their size, the chip spaces 11 and 12 are substantially determined by the diameter dmin1, which defines the point of the chip spaces 11 and 12 which is closest to the axis 4 and which is also designated as core diameter and corresponds to twice the radius or radial distance from the axis 4. The diameter dmin1 is in particular between 27% and 50% of the outside diameter d0 of the milling region 30, in particular preferably 43%.

The size of the smaller chip spaces 13 and 14 is substantially determined by the diameter dmin2, which defines the point of these chip spaces 13, 14 which is closest to the axis 4 (core diameter). Values of between 42% and 75% of the outside diameter d0 of the shank 2 are provided for the diameter dmin2, a value of 60% being preferred.

The chip spaces 11 to 14 are provided as, for example ground-in, flutes for removing chips and are of helical design in the exemplary embodiment shown, that is to say with a rotation or spiral formation about the axis 4, but may also run rectilinearly, i.e. parallel to the axis 4. The rake faces, formed in each case on the walls of the chip spaces 11 to 14, at the associated drilling or milling cutting edges may be of flat or even curved design.

At the drilling region 40, pointing 31 and 32 may be provided at least in the chip spaces 11 and 12 assigned to the drilling cutting edges, that is to say additional beveling, which runs at a smaller angle towards the drill point 25 than the rest of the flute. The corresponding pointing of the drilling end cutting edge or drilling main cutting edges 27 and 28 is of large-volume design in order to ensure unhindered removal of drilling chips.

The movement of the drill thread milling cutter 1 during the drilling comprises an axial linear feed, relative to the axis 4, into the workpiece against the arrow designated by a and simultaneous rotation about the axis 4 in the direction of rotation 15, the drilling cutting edges 17 and 18 and 27 and 28 of the drilling region 40 being continuously in cutting engagement in the workpiece.

According to FIGS. 1 to 3, the drilling is effected with two flutes and the drilling chips are removed via the two chip-receiving spaces 11 and 12.

During the subsequent thread milling, the drill thread milling cutter 1, depending on the design and the thread direction to be produced (left-hand thread or right-hand thread), is moved in a superimposed helix-like movement consisting of a linear feed axially relative to the axis 4, preferably out of the workpiece (return movement) in the direction a, on the one hand, and a rotation (circular movement) of the axis 4 about a central axis of the thread to be produced, with simultaneous rotation about the axis 4 at a greater rotational speed than the circular movement.

During the thread milling, according to FIGS. 1 to 3 all four thread cutting edges 7, 8, 9, 10 of the thread milling region 30 are used, with discontinuous engagement in the workpiece, and milling is carried out with four flutes.

It can be seen from FIGS. 1 and 3 that a plurality of milling cutting edges, e.g. 7, axially offset rectilinearly or helically relative to the axis 4 are arranged over the thread milling region 30 as milling teeth of a thread cutting profile 39 for the parallel production of a plurality of thread turns of the thread. In this case, the milling teeth or milling cutting edges 7 to 10 are each arranged axially in groups of four at one height or one level, the axial distance between the tooth groups corresponding to the thread pitch. The number of tooth groups corresponds to the number of thread turns to be produced, so that one to one and a half revolutions of the tool is sufficient during the circular movement for producing a complete thread. In principle, however, a smaller number of milling teeth in the axial direction of tooth groups may also be provided, the smaller number being compensated for by an increase in the number of revolutions of the drill thread milling cutter 1 during the thread milling.

As can best be seen from FIG. 2, the individual cutting teeth or teeth of the individual milling cutting edges 7, 8, 9, 10 following one another in the axial direction a form a common surface (rake face) towards the chip space, this surface generally being designed to be continuous without steps and/or at least largely flat or even curved.

In other words, primary tooth webs and secondary tooth webs are formed, of which in each case the front side (rake face) of the primary tooth webs and the rear side of the secondary tooth webs are the drilling flutes and the rear sides of the primary tooth webs and the front sides (rake faces) of the secondary tooth webs are the milling flutes. The secondary tooth webs are each set back axially rearwards at the front relative to the primary tooth webs. This may already be effected, for example, by means of the conical point grinding of the drill end cutting edge.

By the secondary tooth webs being set back, this ensures that the coolant and/or lubricant which discharges in the end region of the milling flute passes into the drilling flute to a sufficient extent during the drilling.

Not shown in any more detail in the figures is that fact that the milling cutting edges 7, 8, 9 and 10 (can) narrow (slightly) in the axial direction a. The same applies to the core diameter dmin1 of the chip spaces 11 and 12 and possibly also to the diameter dmin2 of the chip spaces 13 and 14, which may likewise be designed so as to be narrowed over the axis 4.

With regard to the thread length or the length of the thread milling region 30 in the axial direction, the narrowing of the milling cutting edges or of the outside diameter of the thread milling region 30 in materials which are less strong, such as grey cast iron materials (GG) for example, is selected within a region of 0.15%; that is to say that, at a thread length of 15 mm, the difference between the outside diameters at that end of the thread milling region 30 which is located towards the end face, on the one hand, and at that end of the thread milling region 30 which is directed towards the shank 21, on the other hand, would be 0.0225 mm (or 22.5 µm). In contrast, in the case of high-strength materials, in particular in the case of steels, the narrowing is selected to be greater, in particular within a range of between 0.15% and 1%, in particular within a range of between 0.15% and 0.5%, and preferably at around 0.2%. This narrowing compensates for the radial drift of the tool, this drift being greater in a high-strength material than in a material which is less strong.

The narrowing of the core diameter leads to an increase in the volumes of the chip spaces 11 and 12, which come into effect during the drilling, and in the process permits improved chip removal in the case of long-chipping materials. This applies in particular in the case of steels, in which the drilling chips, due to their elasticity, after the stock removal and shaping or curling at the end region, expand or are partly unrolled again during the removal along the flutes 11 and 12 and in which the increase in volume of the flutes therefore partly compensates for this expansion of the chips and provides more space for the drilling chips. The narrowing or decrease in the core diameter dmin1 of the drilling chip spaces 11 and 12 is selected in particular within a range of 0.01 mm to 0.3 mm with respect to an axial length of 10 mm, that is to say a percentage difference or decrease or narrowing of 0.1% to 3% with respect to the inside diameter (or: the flute root or the deepest point of the drill flutes) and over the axial length of the drill flutes.

The milling chip spaces 13 and 14 preferably remain constant in their cross-section and their core diameter dmin2 over the axial length.

Located at that end of the working region 2 which is remote from the end face 16, at the transition to the shank 21, is a countersinking section 20, which is arranged, for example, at 45° and can countersink the finished bore.

Not shown is the fact that the drill thread milling cutter 1 may have an undercut cylindrical part or section at the end of the milling cutting edges in order to remove an incomplete thread turn.

As can also be seen, in particular in FIG. 3, the individual milling cutting edges 7, 8, 9, 10 for the milling and the drilling lateral cutting edges 17 and 18 for the drilling extend essentially up to the same diameter, i.e. up to the circumference 3 of the working region 2, but preferably not so far outwards by a predetermined radial difference in distance t from the axis 4, this difference t being selected from an interval of 0.01 mm (or 10 μm) and 0.03 mm (or 30 μm). The maximum radial distance of the milling cutting edges 7, 8, 9 and 10 and thus of the entire thread milling region 30 from the axis 4 is thus smaller than the maximum radial distance of the drilling lateral cutting edges 17 and 18 and thus of the entire drilling region 40 by the predetermined radial difference in distance t. This selection of the predetermined radial difference in distance t prevents chips from getting caught between the milling cutting edges 7, 8, 9, 10 and the bore inner wall produced by the drilling lateral cutting edges 17 and 18, a factor which could otherwise lead to a fracture of the tool.

Furthermore, provision is advantageously made for at least the drilling main cutting edges and/or the milling cutting edges to be rounded. In this case, the rounding at the drilling cutting edges, depending on the material to be cut, is selected to be greater or smaller and can be produced by brushing or sand blasting and if need be by prior pointing. The rounding is intended firstly to stabilize the drill main cutting edge and secondly to assist the chip breaking. With this configuration, the chip breaking behavior of the drill thread milling cutter is influenced in a very positive manner, so that favorable breaking of long chips occurs, so that the latter collect in the flutes. As a result, damage to the tool is prevented or at least made more difficult.

Furthermore, the cutting edges may have a margin running out to the outside diameter, that is to say they may run slightly curved or in a rounded manner. This results in improved chip removal.

It can be seen when comparing FIGS. 1 and 2 how the coolant and/or lubricant supply may be implemented. A central coolant and/or lubricant passage (coolant and/or lubricant bore) 23 is incorporated coaxially to the axis 4 in the shank 21 and the working region 2, this coolant and/or lubricant passage 23 branching at its end into two sectional passages which open out in a respective outlet opening 26 in each case in one of the smaller chip spaces 13 and 14 at their front ends. Accordingly, provision may of course also be made for coolant and/or lubricant to discharge into the chip-receiving spaces 11 and 12, respectively.

The illustrated embodiments are only examples of the present invention and, therefore, are non-limitive. It is to be understood that many changes in the particular structure, materials, and features of the invention may be made without departing from the spirit and scope of the invention. Therefore, it is the Applicant's intention that its patent rights not be limited by the particular embodiments illustrated and described herein, but rather by the following claims interpreted according to accepted doctrines of claim interpretation, including the Doctrine of Equivalents and Reversal of Parts.

What is claimed is:

1. Drill thread milling cutter (1)
   a) which is rotatable about an axis (4) at least in one direction of rotation (15), and has
   b) a drilling region (40) with at least one drilling cutting edge (17, 18, 27, 28) for producing a bore in a workpiece, and
   c) a thread milling region (30) with at least one milling cutting edge (7, 8, 9, 10) for the subsequent milling of a thread in the bore of the workpiece,
   wherein axially relative to the axis (4), following at least one drilling cutting edge (17, 18, 27, 28) of the drilling region (40), in each case at least one associated milling cutting edge (8, 10) of the thread milling region (30) is arranged at an associated common drilling chip space (11, 12) for removing the drilling chips produced by the drilling cutting edge and preferably also for removing the milling chips produced by these milling cutting edges, and in which at least one further milling cutting edge (7, 9) of the thread milling region (30), is arranged at at least one milling chip space (13, 14) for removing the milling chips produced by this at least one further milling cutting edge, this milling cutting edge (7, 9) being offset in the direction of rotation relative to the milling cutting edge(s) at the drilling chip space (11, 12) which is (are) arranged so as to follow the drilling cutting edge(s), the volume of each drilling chip space (11, 12) available for the chip removal being greater than that of the milling chip space or spaces (13, 14) and each milling chip space (13, 14), at its point closest to the axis (4), lying on a diameter ($d_{min2}$) which is between 42% and 75% of the outside diameter ($d_0$) of the thread milling region (30), and each drilling chip space (11, 12), at its point closest to the axis (4), lying on a diameter ($d_{min1}$) is between 27% and 50% of the outside diameter ($d_0$) of the thread milling region (30).

2. Drill thread milling cutter according to claim 1, in which
   a) the diameter ($d_{min2}$) of each milling chip space (13, 14) at the point closest to the axis (4) is essentially constant in axial extension from the drilling region (40) over the thread milling region (30), or the volume of each drilling chip space (11, 12) is essentially constant in axial extension from the drilling region (40) over the thread milling region (30),
   and/or in which
   b) the diameter ($d_{min2}$) of each milling chip space (13, 14) at the point closest to the axis (4) decreases in axial extension from the drilling region (40) over the thread milling region (30), or the volume of each drilling chip space (11, 12) increases in axial extension from the drilling region (40) over the thread milling region (30), the decrease in the diameter of the drilling chip space or milling chip space preferably being selected to be between 0.1% and 3% over the axial length and/or, depending on the material of the workpiece, to be greater in particular in the case of high-strength materials of the workpiece, such as steels, than in the case of materials which are less strong,
   and/or in which
   c) at least a section of the boundary surface of at least one chip space (11, 12, 13, 14) runs in a circular or elliptical or parabolic or hyperbolic shape and/or is designed to be symmetrical or asymmetrical relative to a line running radially relative to the axis (4),
   and/or in which
   d) the chip spaces (11, 12, 13, 14) form right- or left-hand spiral flutes or straight flutes.

3. Drill thread milling cutter according to claim 1, in which
   a) a milling cutting edge (8, 10) arranged at a drilling chip space (11, 12) is at a greater angular distance from a milling cutting edge (9, 7), at a milling chip space, preceding in the direction of rotation than from a milling cutting edge (7, 9), at a milling chip space, following in the direction of rotation,
   and/or in which
   b) a milling cutting edge (8, 10) arranged at a drilling chip space (11, 12) is at an angular distance (a) of at most 88° from a milling cutting edge (9, 7), at a milling chip space, following in the direction of rotation.

4. The drill thread milling cutter according to claim 1 further comprising a number of milling cutting edges (7, 8, 9, 10) greater than the number of drilling cutting edges (17) by a factor greater than 2 are arranged or are effective in the direction of rotation.

5. The drill thread milling cutter according to claim 1 wherein each milling chip space (13, 14), at its point closest to the axis (4), lying on a diameter (dmin2) is 60% of the outside diameter (d0) of the thread milling region.

6. The drill thread milling cutter according to claim 1 wherein each drilling chip space (11, 12) at its point closest to the axis (4), lying on a diameter (dmin1) is 43% of the outside diameter (d0) of the thread milling region.

7. Drill thread milling cutter (1)
a) which is rotatable about an axis (4) at least in one direction of rotation (15), and has
b) a drilling region (40) with at least one drilling cutting edge (17, 18, 27, 28) for producing a bore in a workpiece, and
c) a thread milling region (30) with at least one milling cutting edge (7, 8, 9, 10) for the subsequent milling of a thread in the bore of the workpiece,
wherein
d) axially relative to the axis (4), following at least one drilling cutting edge (17, 18, 27, 28) of the drilling region (40), in each case at least one associated milling cutting edge (8, 10) of the thread milling region (30) is arranged at an associated common drilling chip space (11, 12) for removing the drilling chips produced by the drilling cutting edge and preferably also for removing the milling chips produced by these milling cutting edges, and
e) the diameter (dmin1) of each drilling chip space (11, 12) at the point closest to the axis (4) decreases in axial extension from the drilling region (40) over the thread milling region (30), or the volume of each drilling chip space (11, 12) increases in axial extension from the drilling region (40) over the thread milling region (30).

8. Drill thread milling cutter according to claim 7, in which
a) the diameter (dmin2) of each milling chip space (13, 14) at the point closest to the axis (4) is essentially constant in axial extension from the drilling region (40) over the thread milling region (30), or the volume of each drilling chip space (11, 12) is essentially constant in axial extension from the drilling region (40) over the thread milling region (30),
and/or in which
b) the diameter (dmin2) of each milling chip space (13, 14) at the point closest to the axis (4) decreases in axial extension from the drilling region (40) over the thread milling region (30), or the volume of each drilling chip space (11, 12) increases in axial extension from the drilling region (40) over the thread milling region (30), the decrease in the diameter of the drilling chip space or milling chip space preferably being selected to be between 0.1% and 3% over the axial length and/or, depending on the material of the workpiece, to be greater in particular in the case of high-strength materials of the workpiece, such as steels, than in the case of materials which are less strong,
and/or in which
c) at least a section of the boundary surface of at least one chip space (11, 12, 13, 14) runs in a circular or elliptical or parabolic or hyperbolic shape and/or is designed to be symmetrical or asymmetrical relative to a line running radially relative to the axis (4),
and/or in which
d) the chip spaces (11, 12, 13, 14) form right- or left-hand spiral flutes or straight flutes.

9. Drill thread milling cutter according to claim 7, in which
a) a milling cutting edge (8, 10) arranged at a drilling chip space (11, 12) is at a greater angular distance from a milling cutting edge (9, 7), at a milling chip space, preceding in the direction of rotation than from a milling cutting edge (7, 9), at a milling chip space, following in the direction of rotation,
and/or in which
b) a milling cutting edge (8, 10) arranged at a drilling chip space (11, 12) is at an angular distance (a) of at most 88° from a milling cutting edge (9, 7), at a milling chip space, following in the direction of rotation.

10. The drill thread milling cutter according to claim 9 wherein the milling cutting edge (8, 10) arranged at a drilling chip space (11, 12) is at an angular distance in the range of 62° and 88°.

11. The drill thread milling cutter according to claim 9 wherein the milling cutting edge (8, 10) arranged at a drilling chip space (11, 12) is at an angular distance in the range of between 82° and 85° or between 72° and 78°.

12. The drill thread milling cutter according to claim 7 further comprising a number of milling cutting edges (7, 8, 9, 10) greater than the number of drilling cutting edges (17) by a factor greater than 2 are arranged or are effective in the direction of rotation.

* * * * *

UNITED STATES PATENT AND TRADEMARK OFFICE
CERTIFICATE OF CORRECTION

PATENT NO.            : 7,419,339 B2                                            Page 1 of 1
APPLICATION NO.  : 11/388471
DATED                    : September 2, 2008
INVENTOR(S)          : Helmut Glimpel and Matthias Sperber It is certified that error appears in the above-identified patent and that said Letters Patent is hereby corrected as shown below:

On the title page item (73),
Assignee: replace "EMUGE-Werk Richard Glimbel GmbH & Co. Fabrik für Präzisionswerkzeuge" with -- EMUGE-Werk Richard Glimpel GmbH & Co. KG Fabrik für Präzisionswerkzeuge --

Signed and Sealed this

Fifth Day of May, 2009

JOHN DOLL
*Acting Director of the United States Patent and Trademark Office*